United States Patent [19]
James

[11] 3,778,962
[45] Dec. 18, 1973

[54] VACUUM CONTROLLED VESSEL LOADING WITH PARTICULATE MATERIALS

[75] Inventor: Maurice L. James, Pinole, Calif.
[73] Assignee: Calcato, Inc., Richmond, Va.
[22] Filed: Mar. 30, 1972
[21] Appl. No.: 239,552

[52] U.S. Cl. .................................. 53/35, 53/38
[51] Int. Cl. ............................................ B65b 1/06
[58] Field of Search .................. 141/114; 53/29, 30, 53/35, 38

[56] References Cited
UNITED STATES PATENTS
3,562,998  2/1971  Edwards ............................ 53/35 X Primary Examiner—Andrew R. Juhasz
Assistant Examiner—W. D. Bray
Attorney—Stephen S. Townsend et al.

[57] ABSTRACT

Method for loading friable particulate matter without substantial free fall into vertical columns. A container is provided having first and second openings. The first opening includes means for vacuum closure of the container, while the second opening is for joining to a grid protected connection to a vacuum line. The vacuum controlled opening may be a flap which is hermetically sealed to a rigid collar or a cylindrical plastic sheet which collapses upon itself to provide a hermetic seal. After the container is filled, the vacuum applied and the vacuum seal formed, the container may be lowered into the column to a solid surface. The vacuum is then partially or completely released, which causes breaking of the seal, and the container raised releasing the particulate matter without substantial free fall.

11 Claims, 5 Drawing Figures

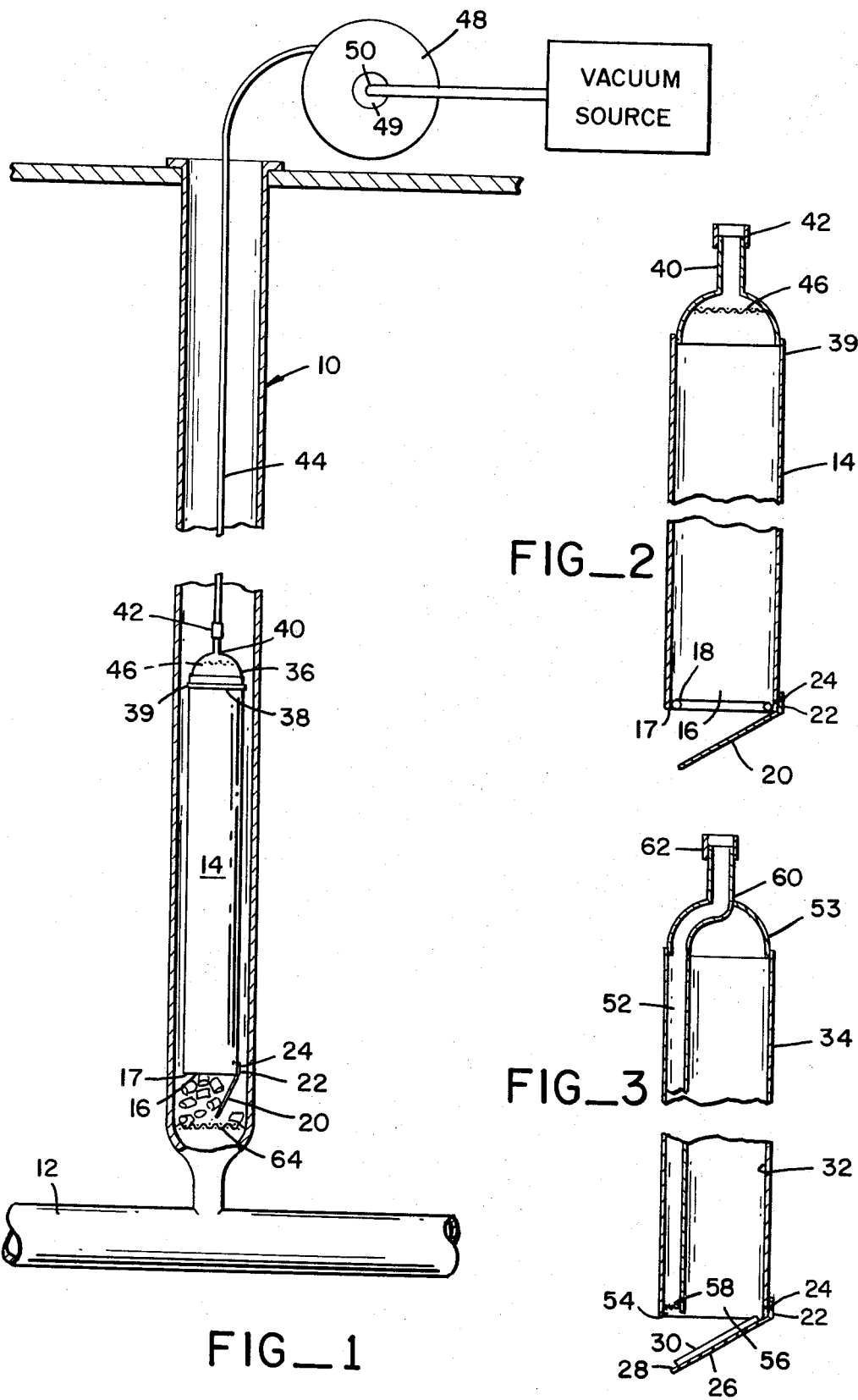

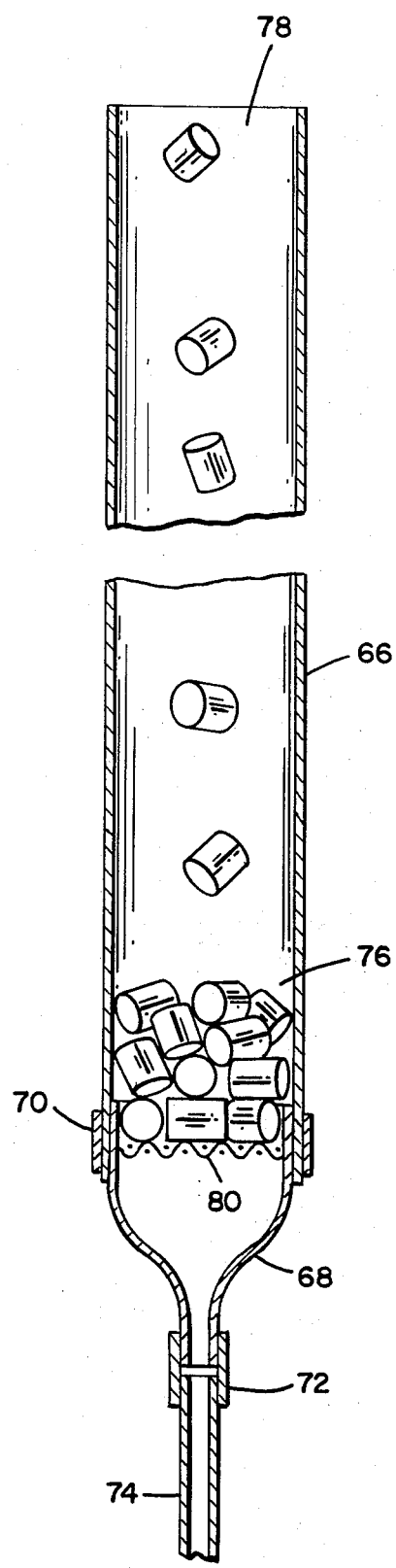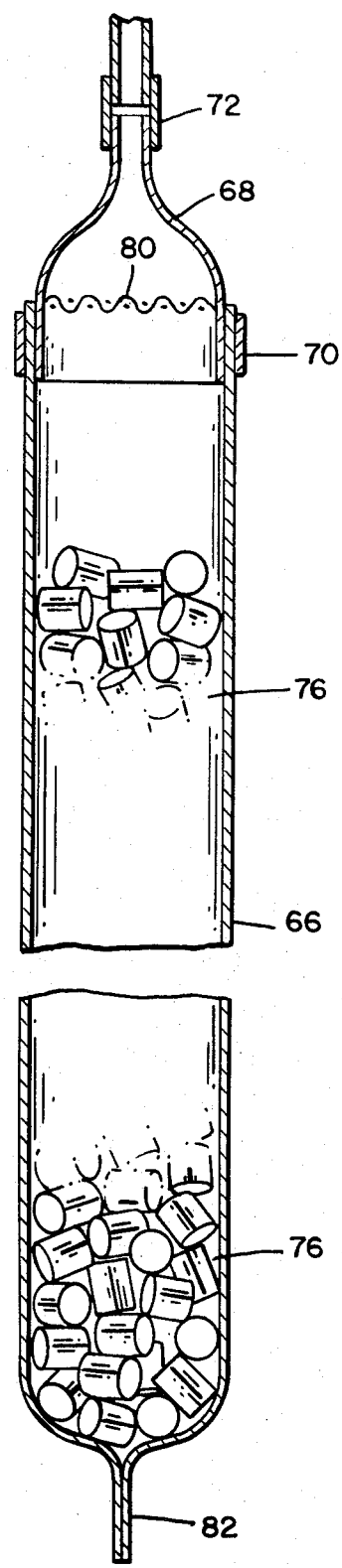
FIG_4       FIG_5

VACUUM CONTROLLED VESSEL LOADING WITH PARTICULATE MATERIALS

BACKGROUND OF THE INVENTION

1. Field of the Invention

In chemical and petroleum processing, it is frequently necessary to load friable particulate matter into relatively long, narrow columns. The columns are usually cylindrical tubes of 1 or more inches in diameter.

In the past, significant difficulty was encountered in this operation, because of the many restrictions imposed upon the operation. Because the material is friable, and impact from a substantial free fall results in breakage and dust formation, methods had to be developed to avoid substantial free falls or soften the impact. While in the past falls of up to three feet have been permitted, more recently, permissible free falls have been limited to 2feet or fewer.

In addition, it is necessary to have a fairly accurate recording of the weight of the material introduced into the operating vessel with minimal pressure drop through the vessel. Both of these characteristics reflect a concern with the amount of dust present in a loaded vessel.

The concern with dust, as well as small chips, is related to the fact that the greater the amount of dust and small chips, the greater the volumetric or bulk density. Therefore, although a vessel may be filled with the appropriate weight of material, the vessel itself may not be completely filled because of the higher bulk density of the material in the vessel, as compared to the theoretical bulk density of the particulate material without dust and small chips. Furthermore, as the bulk density increases, the porosity decreases, increasing the pressure drop through the vessel. Operating efficiency of the vessel is reduced, and also, decreased catalyst life frequently results.

In loading friable particulate matter into a vertical vessel, it is therefore desirable to obviate any free fall or substantial impact of the friable material and to remove dust, should any be present of form during the loading operation.

2. Description of the Prior Art

United States Pat. No. 3,562,998 describes a method for loading particulate material employing a releasable adhesive seal.

SUMMARY OF THE INVENTION

Method and apparatus are provided for loading friable particulate matter into a vertical vessel from the top. The apparatus is a housing having a means for vacuum sealing at one end and a means protected by a grid for connection to a vacuum source at the other end. Sealing can be achieved by a flexible flap positioned adjacent the first opening to provide a vacuum seal against a rigid ring or by use of flexible plastic sheet which collapses upon itself to form a seal.

In loading the vessel with particulate matter, the particulate matter is introduced into the container through the first opening, a vacuum applied through the second opening and the seal formed. The pressure differential between the inside and outside of the container holds the seal.

The container is then lowered into the vessel to be loaded with the first opening of the container in the lower position. When the container encounters a solid surface, such as a grid or particulate matter, the vacuum is released, releasing the seal, and the container slowly raised. The container opens gently releasing the particulate matter.

BRIEF DESCRIPTION OF THE SEVERAL VIEWS OF THE DRAWINGS

FIG. 1 is an elevational cross section with the apparatus of this invention in operation;

FIG. 2 is a sectional view of one embodiment of the subject invention;

FIG. 3 is a cross-sectional view of an alternate embodiment of the subject invention;

FIG. 4 is an elevational cross-sectional view of an alternate embodiment of the subject invention, being loaded with friable matter; and FIG. 5 is a cross-sectional view of the embodiment of FIG. 4 in its closed mode in position for loading of a column.

DESCRIPTION OF THE SPECIFIC EMBODIMENTS

In the subject invention, a method is employed for preventing free fall of friable particulate matter, a problem encountered in loading an open zone in a vertical vessel. The apparatus employed in the subject invention is a container having an open end for loading of the container with the particulate matter. The container may be of any convenient material, such as a plastic, e.g., polyethylene.

In one embodiment, a sealing flap is affixed adjacent the open end and is of a dimension to completely cover the opening in hermetic engagement. A second opening is provided in the container for connection to a vacuum source. The connection to the vacuum source is protected from clogging, for example, by a grid or screen. The second opening will normally have a hose or tube ending in a connecting or coupling device for connecting to a hose to a vacuum source.

Alternatively, instead of the sealing flap, a tube or skirt of durable plastic sheet may be employed which will collapse upon itself to form a tight seal when a vacuum is applied. The container may be of the same composition as the plastic tube or may be of more rigid construction, as desired.

In carrying out the method of this invention, the container with the flap is held in an upright position with the sealing flap open. The friable particulate matter is carefully introduced into the container until the container is filled. The weight of material introduced intthe container is recorded. The flap is then placed over the opening, so as to completely cover the opening.

If the second opening has not previously been connected to an air hose to a vacuum source, the second opening is now connected. A vacuum is applied to the container, resulting in a hermetic seal between the sealing flap and the container surface about the opening. The container is then lowered into the vessel. Conveniently the hose to the vacuum source is employed as a means for controlling the lowering of the container, although an auxiliary cable could be provided. When the container will no longer move because of engaging the bottom of the zone, e.g., the bottom of the vessel or the existing particulate matter level, the vacuum is partially or completely released. The flap is then free to open, except for engagement with the solid bottom surface of the zone. By slowly raising the container, the flap opens and the particulate matter in the container exits slowly without free fall. If a partial vacuum is maintained, the flow of air through the vessel will continue to remove any dust which may have been formed during the operation or which has previously been present in the vessel.

The operation may be repeated as many times as required, until the zone or vessel is completely loaded with particulate matter. Any type of particulate matter which requires protection from free fall and is other than a dust or powder may be loaded into a vessel in accordance with this invention. Such types of particulate matter include catalysts, heat transfer agents, microsieves, ceramic rings, fragile packing material, etc.

With the plastic tube providing the first opening, sealing will be carried out by holding the end of the tube at opposite points and pulling the points away from each other, so that, in effect, there will be two sheets facing each other. When the vacuum is applied, the tube will collapse on itself to form a tight seal, with the two sheets pressed tightly together. When the container has been lowered into the column and has encountered a solid base, release of the vacuum will allow for release of the particulate matter either immediately or upon raising the container.

For further understanding of this invention, the drawings will now be considered. In FIG. 1, a typical vessel 10 is depicted mounted on header 12. While in the figure the vessel is depicted as tubular, any shape vessel can be accommodated in accordance with this invention. However, for the most part, vessels will be tubular.

The container 14 will be shaped in accordance with the shape of the vessel. With tubular vessels, the container will normally be a tube having an outer diameter about one-half inch less than the inner diameter of the tubular vessel 10. The container can be made of a wide variety of materials, but most conveniently, flexible plastic hose will be employed. Usually, the walls of the container will have sufficient strength, so as not to bulge significantly under the weight of the particulate material in the container.

At one end of the container 14 is opening 16. When the container 14 is tubular, the opening 16 will generally be equal in size to the inner diameter of the container 14. However, for enchanced strength or reinforcement, as well as for improved sealing, a small inner ring 18 may be provided, flush with end wall 17. The ring 18 may be of the same or different material than the container 14. The sealing flap 20 is affixed to container 14 adjacent the opening 16 by means of tab 22 which is attached to the container 14 by rivet 24. Other means of affixing the sealing flap can be employed, such as a hinge. Various constructions may be used for the sealing flap 20, depending on the construction of the opening 16. In some instances, it may be advantageous to connect the sealing flap 20 to the inside of the container 14, rather than the outside.

The cross section of the sealing flap 20 will be at least greater than the cross section of the opening 16. Any convenient configuration for the openign 16 can be used, with a complementary configuration for the sealing flap 20. The sealing flap 20 will normally be circular, having a diameter greater than the inner diameter of the opening 16 and usually less than the outer diameter of the end wall 17 about the opening 16.

The sealing flap 20 will be made of material which is sufficiently resilient to provide a hermetic seal with the container 14, but of sufficient rigidity to provide support for the particulate material in the container. Various materials which may be employed include leather, hardened rubbers, plastics, etc.

In some instances, a modified flap 26 can be employed having a step 28 to provide a raised platform 30. When the flap 26 is closed, the sidewalls of the step 28 engage the inner wall 32 of the container 34 to provide a secure seal. When the vacuum in the container 34 is released, the weight of the particulate matter will force the flap 26 downward to open the container 14 and release the particulate matter.

At the end opposite the opening 16 a reducer 36, normally metal, is banded, or otherwise firmly fixed in place. The large end 38 of the reducer is sleeved in the upper end 39 of the container 14. The small end 40 of the reducer has a connector 42 for connection to an air hose 44.

The connector or coupler 42 is connected to an air hose 44. Conveniently, a 1-inch industrial air hose may be employed. The air hose should be of industrial strength quality, and wire reinforced, so as to support the weight of the entire unit. However, as already indicated, an auxiliary cable could be provided, if desirable.

Inside the reducer 36 is a screen or grid 46 to prevent the particulate material from entering the air hose 44. The screen or grid 46 will have smaller mesh size, than the mesh size of the particulate material, but large enough to allow for passage of dust and small chips.

The air hose 44 is conveniently connected to a reel 48 which serves to raise and lower the container 14 by retrieving and releasing the air hose 44. The end of the air hose 44 distant from the container 14 is connected to a conduit, not shown, opening into the hub 49 of the reel. The hub 49 has orifice 50 for connection to an appropriate vacuum source, such as a pump. The hub 49 therefore serves as a conduit between the air hose 44 and the hose to the vacuum source.

In some instances, it may be advantageous to have the opening in the container to the vacuum source adjacent the flap. In FIG. 3, the container 34 has internal conduit 52 extending from a head 53 opposite the opening 56 through the container 34 to a position adjacent the opening 56, so as to have port 54 in close proximity to container opening 56. The port 54 is protected from clogging by screen 58. The conduit 52 exits from the container 34 through aperture 60 in head 53 and connects with coupler 62. The coupler 62 may then be connected to air hose 44.

In FIG. 4, a container is employed without a sealing flap. The container 66 is a heavy cylindrical plastic tube of convenient length and diameter. A reducing adapter 68 is introduced into one end of the tube 66 and a sealing ring 70 set over that portion of the container 66 which surrounds the adapter 68. The sealing ring 70 squeezes the container so as to provide a tight seal between the adapter 68 and the container 66. The adapter 68 has a coupler 72 for connection to a vacuum hose 74. Catalyst 76 or other friable material may be introduced into the container through opening 78.

When the container is filled to a level allowing for a portion of the tubular container 66 to form a seal, the opening 78 is closed by bringing together the plastic so as to form a flat wall 82. The vacuum may now be applied, so that the pressure differential, causes the plastic to collapse on itself and form a seal between the inner walls of the plastic container. In order to protect the opening from being clogged by friable particulate matter, a grid or screen 80 is provided in the adapter 68.

The container 66 may now be inverted as depicted in FIG. 5. The container wall at one end has collapsed on itself to form a wall 82 which provides a tight seal, as long as the vacuum is maintained.

In carrying out the method of this invention, the particulate matter will first be loaded into bags and weighed. When the desired weight is obtained, the container may then be set upright, with the sealing means in the open position. By employing a funnel, which fits to the container, the catalyst may be loaded from the bags through the funnel into the container, until the container is filled. The particulate matter is prevented from entering the air hose by means of the wire screen or grid.

The vacuum pump may now be turned on and the opening closed, in accordance with the apparatus being used. The amount of weight which can be supported by the sealing structure can be easily determined and the size of the container will vary, as required. Obviously, the greater the bulk density, the smaller the total which will be supportable.

As the pressure diminishes in the container, dust and small particles will be carried up through the reducer into the air hose. A collector can be provided so as to protect the vacuum source from the dust. Various screens or baffles may be used, as required.

When the seal is secure, the container is inverted (seal down) and lowered into the vessel. The container is initially lowered by hand until tension is taken by the air hose reel which is situated above the container. The container is carefully lowered using the reel until the container touches a screen 64 at the vessel bottom or existing particulate matter level. The vacuum is then released.

If further flushing of the particulate matter is desired to remove any dust which may have formed during the operation, a partial vacuum may be continued, insufficient for sealing, but sufficient for removal of dust. Otherwise, the vacuum source may be shut off completely. As the container is raised, the seal will open and the particulate matter will begin to spill out. The flap or tube will serve additionally as a slide for the particulate matter. The container is raised slowly until all of the particulate matter has spilled out and may then be raised rapidly to the working platform to repeat the cycle.

The subject invention provides a number of advantages in the loading of vertical vessels with friable particulate matter. The particulate matter may be accurately weighed prior to transfer to the vertical vessel. The transfer from the weighing device to the container employed in the subject invention can be carried out without substantial impact or abrasion of the particulate matter. Once the container of the subject invention is loaded, movement of the particulate matter in the container is effectively prevented and any dust and small particles or chips which may be present are removed by the stream of air resulting from the application of a vacuum to the container.

The hose employed for connecting to the vacuum can also be used as a line for lowering the container into the vessel. The container is opened merely by turning off the vacuum and the particulate matter spills out by virtue of gravity, without any free fall. A partial vacuum can be maintained after release of the particulate matter to further remove any dust or small chips in the vessel.

By employing the apparatuses of the subject invention, and using a plurality of containers, containers can be loaded with catalyst while other containers are being employed for loading the column. In this way, no time is lost between unloading one of the containers in the column and removing the container from the column and introducing a second container into the column filled with particulate matter. Where the tubular container forms its own seal, one can employ a roll of tubular plastic, which can be cut to any convenient size, and then fitted onto the adapter. Flexibility is provided in varying the size of the container as required, both as to length and cross section.

Although the foregoing invention has been described in some detail by way of illustration and example for purposes of clarity of understanding, it will be obvious that certain changes and modifications may be practiced within the scope of the invention, as limited only by the scope of the appended claims.

I claim:

1. A method of loading particulate matter into a vertical vessel having an open zone while substantially avoiding free fall of said matter comprising the steps of: introducing said particulate matter into a container through a first opening having vacuum sealing means; sealing said first opening by applying a vacuum to the inside of said container through a second opening, so that said sealing means seals said first opening; lowering said container into said vessel while maintaining said vacuum, until said container is adjacent the bottom of said open zone; and reducing said vacuum and raising said container, so as to release said particulate matter from said container into said open zone while preventing substantial free fall of said particulate matter.

2. A method according to claim 1, wherein said sealing means is a sealing flap.

3. A method according to claim 1, wherein said sealing means is a flexible plastic skirt.

4. A method according to claim 3 wherein said container is made of flexible plastic tubing.

5. A method according to claim 1, wherein said vacuum is applied through an air hose and said lowering is achieved by suspending said container from said air hose.

6. A method according to claim 1, wherein the cross section of said container substantially conforms to the cross section of said open zone.

7. A method according to claim 1, wherein said container is made of polyethylene.

8. A method according to claim 2, wherein said sealing flap is affixed to said container adjacent said first opening.

9. A method of loading particulate matter into a vertical vessel having an open zone while substantially avoiding free fall of said matter comprising the steps of: affixing a plastic tube at one end to a reducing adapter having means for coupling to an air hose; substantially filling said tubular container with friable particulate matter; closing the open end of the tube while applying a vacuum through said reducing adapter; lowering said container into said vessel while maintaining said vacuum, until said container is adjacent the bottom of said open zone; and reducing said vacuum and raising said container, so as to release said particulate matter from said container into said open zone, while preventing substantial free fall of said particulate matter.

10. A method according to claim 9, wherein said adapter has a screen for preventing said particulate matter from entering said air hose.

11. An apparatus for loading particulate matter into a vertical vessel comprising: a container having a first opening; a sealing flap affixed to said container adjacent said first opening; a second opening in said container of substantially smaller cross section than said first opening; and means adjacent said second opening for preventing particulate matter from entering said second opening.

* * * * *